(12) United States Patent
Palapudi et al.

(10) Patent No.: US 7,752,598 B2
(45) Date of Patent: Jul. 6, 2010

(54) GENERATING EXECUTABLE OBJECTS IMPLEMENTING METHODS FOR AN INFORMATION MODEL

(75) Inventors: Sriram Palapudi, Santa Clara, CA (US); Maria Savarimuthu Rajakannimariyan, San Jose, CA (US); Rainer Wolafka, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1454 days.

(21) Appl. No.: 11/130,344

(22) Filed: May 13, 2005

(65) Prior Publication Data

US 2006/0271911 A1 Nov. 30, 2006

(51) Int. Cl.
G06F 9/44 (2006.01)
G06F 9/45 (2006.01)
(52) U.S. Cl. .................. 717/108; 717/116; 717/120; 717/140
(58) Field of Classification Search .............. None
See application file for complete search history.

(56) References Cited

U.S. PATENT DOCUMENTS

| | | | | |
|---|---|---|---|---|
| 6,467,079 | B1 * | 10/2002 | Ettritch et al. | 717/108 |
| 2002/0091809 | A1 | 7/2002 | Menzies et al. | |
| 2003/0217195 | A1 | 11/2003 | Mandal et al. | |
| 2004/0015889 | A1 | 1/2004 | Todd et al. | |
| 2004/0025142 | A1 | 2/2004 | Mandal et al. | |
| 2004/0068733 | A1 | 4/2004 | Longbardi | |
| 2005/0278709 | A1 * | 12/2005 | Sridhar et al. | 717/136 |

FOREIGN PATENT DOCUMENTS

| | | |
|---|---|---|
| EP | 1061441 A2 | 12/2000 |
| FR | 2816420 A1 | 5/2002 |

OTHER PUBLICATIONS

DMTF, "Common Information Model (CIM) Core Model White Paper", Distributed Management Task Force, Inc., Version 2.4, Aug. 30, 2000, DSP0111, Dec. 18, 2000, pp. 1-54.
DMTF, "CIM Tutorial>Introduction", Distributed Management Task Force, Inc., [retrieved online Jun. 13, 2003] http://www.wbemsolutions.com/tutorials/CIM/.

(Continued)

*Primary Examiner*—Chuck O Kendall
(74) *Attorney, Agent, or Firm*—David W. Victor; Konrad Raynes and Victor LLP (57) ABSTRACT

Provided are a method, system, and program for generating executable objects implementing methods for an information model. A file including code defining a class implementing at least one method in an information model is received. The file is translated to produce an object oriented implementation of the class and the at least one method in an object oriented programming (OOP) language file. Protocol statements of the information model are added to the OOP file to enable a client application to invoke the at least one method on a server. The OOP file is compiled to produce an executable object capable of being invoked by a call to a method invocation statement, wherein the client application calling the method invocation statement causes execution of the protocol statements and the at least one method in the executable object to invoke the at least one method on the server.

30 Claims, 5 Drawing Sheets

OTHER PUBLICATIONS

DMTF, "Specification for CIM Operations over HTTP", Distributed Management Task Force, Inc., pp. 1-88 [retrieved online Feb. 10, 2003] http://www.dmtf.org/standards/documents/WBEM/DSP200.html.

DMTF, "CIM Interop Model White Paper CIM Version 2.7", Distributed Management Task Force, Inc., Version 0.9, Jun. 19, 2003, pp. 1-31.

DMTF, "Common Information Model (CIM) Infrastructure Specification", Distributed Management Task Force, Inc., Version 2.3 Preliminary, DSP0004, Aug. 11, 2004, pp. 1-106.

Sun Microsystems, Inc., "Class CIMDataType", pp. 1-12, [retrieved online Apr. 15, 2005], http://www.wbemservices.souceforge.net/javadoc/api/javax/wbem/cim/CIMDataType.html.

Sun Microsystems, Inc., "Class CIMNameSpace", pp. 1-4,[retrieved online Apr. 15, 2005], http://www.wbemservices.souceforge.net/javadoc/api/javax/wbem/cim/CIMNameSpace.html.

Sun Microsystems, Inc., "Class CIMClient", pp. 1-31,[retrieved online Apr. 16, 2005], http://www.wbemservices.souceforge.net/javadoc/api/javax/wbem/cim/CIMClient.html.

Sun Microsystems, Inc., "Class CIMObject Path", pp. 1-6, [retrieved online Apr. 16, 2005], http://www.wbemservices.souceforge.net/javadoc/api/javax/wbem/cim/CIMObjectPath.html.

Sun Microsystems, Inc., "Solaris WBEM Developer's Guide", Chapter 6, pp. 1-2,[retrieved online Apr. 16, 2005], http://www.docsun.cites.uiuc.edu/sun_docs/C/solaris_9/SUNWdev/WBEM....

Sun Microsystems, Inc., "Solaris WBEM Developer's Guide", Chapter 7, pp. 1-3, [retrieved online Apr. 15, 2005], http://www.docsun.cites.uiuc.edu/sun_docs/C/solaris_9/SUNWdev/WBEMSDKDG/p.28.html.

Sun Microsystems, Inc., "Solaris WBEM SDK Developer's Guide", Chapter 3—Writing a Client Program,, pp. 1-3, [retrieved online Apr. 17, 2005], http://www.wbemservices.sourceforge.net/WBEMSDKDG_html/p8.html.

Sun Microsystems, Inc., "Solaris WBEM SDK Developer's Guide", Chapter 3,—Performing Basic Client Operations, pp. 1-3,[retrieved online Apr. 17, 2005], http://www.wbemservices.sourceforge.net/WBEMSDKDG_html/p9.html#CL....

* cited by examiner

```
public CIMTest{
   public boolean createFCCG(final String name){
      int retcode = -1
      CIMClient cimClient = null;
      m_scsPath = new CIMObjectPath("IBMESS_Service",
CIMNameSpace.DEFAULT_NAMESPACE);
      m_scsPath.addKey("CreationClassName", new CIMValue("IBMESS_Service");
      m_scsPath.addKey("Name", new CIMValue(m_clusterName));
      m_scsPath.addKey("SystemCreationClassName", new CIMValue(
"IBMESS_Service"));
      m_scsPath.addKey("SystemName", new CIMValue(m_clusterName));
      try{
         cimClient = new CIMClient("locahost");
         Vector in = new Vector();
         Vector out = new Vector();
         in.add(new CIMProperty("CopyType", new CIMValue("4",
CIMDataType.getPredefinedType(CIMDataType.UINT16))));
         in.add(new CIMProperty("ElementName", new CIMValue(name)));
         CIMValue cv = cimClient.invokeMethod(m_scsPath, "CreateSynchronizedSet",
in, out);
         int retcode = new Integer(cv.getValue().toString()).intValue();
      }catch(Exception e){
         ;
      }
      return retcode == 0;
   }
   public static void main(String[] args){
if(new CIMTest().createFCCG("volume1")){
   System.out.println("passed");
}
else{
   System.out.println("failed");
}
}
```

```
public CIMTestWithClass{
   public static void main(String [] args){
   try{
      new IBMESS_Service().createSynchronizedSet(4, "volume1");
      System.out.println("passed");
   }catch(Exception e){
      System.out.println("failed");
   }
  }
 }
}
```

GENERATING EXECUTABLE OBJECTS IMPLEMENTING METHODS FOR AN INFORMATION MODEL

BACKGROUND OF THE INVENTION

1. Field of the Invention

The present invention relates to a method, system, and program for generating executable objects implementing methods for an information model

2. Description of the Related Art

The Common Information Model (CIM) is an industry standard specification to allow for the interchange of management information in a network environment including devices from different vendors, where the network may include heterogeneous as well as homogeneous devices. The CIM schema specifies a set of classes, including methods and objects, that management programs call to obtain information and perform management operations with respect to devices in the network. Each vendor of a network device that is capable of interfacing in a CIM environment must provide a set of device specific APIs that implement the CIM classes. A vendor would provide a CIM Provider, which is a program module that maps CIM APIs or methods, as defined by the industry standard CIM model, to device specific APIs that may implement the functionality of a defined CIM API for the specific device. The term "CIM API" as used herein refers to any method, interface or function that is called to perform an operation defined within the CIM management schema.

The CIM schema has three layers. First, a core schema captures notions that are applicable to all areas of management. Second, common schemas capture notions that are common to particular management areas, but independent of a particular technology or implementation. The common areas are systems, devices, networks, applications, metrics, databases, the physical environment, event definition and handling, management of a CIM infrastructure (the Interoperability Model), users and security, policy and trouble ticketing/knowledge exchange (the Support Model). These models define classes addressing each of the management areas in a vendor-neutral manner. Third, extension schemas represent organizational or vendor-specific extensions of the common schema. These schemas can be specific to environments, such as operating systems, technology-specific areas, and product specific areas. The formal definition of the CIM Schema is expressed in a Managed Object File (MOF) which is an ASCII or UNICODE file that can be used as input into an MOF editor, parser or compiler to produce executable code that may be called by a CIM application.

In the current art, to invoke a CIM method, a developer writes a CIM application that includes numerous CIM protocol statements to allow the CIM client application to establish communication with the CIM provider and instantiate the object and classes at the server to enable execution of the methods the developer wants to include in the CIM application.

Figure 1:
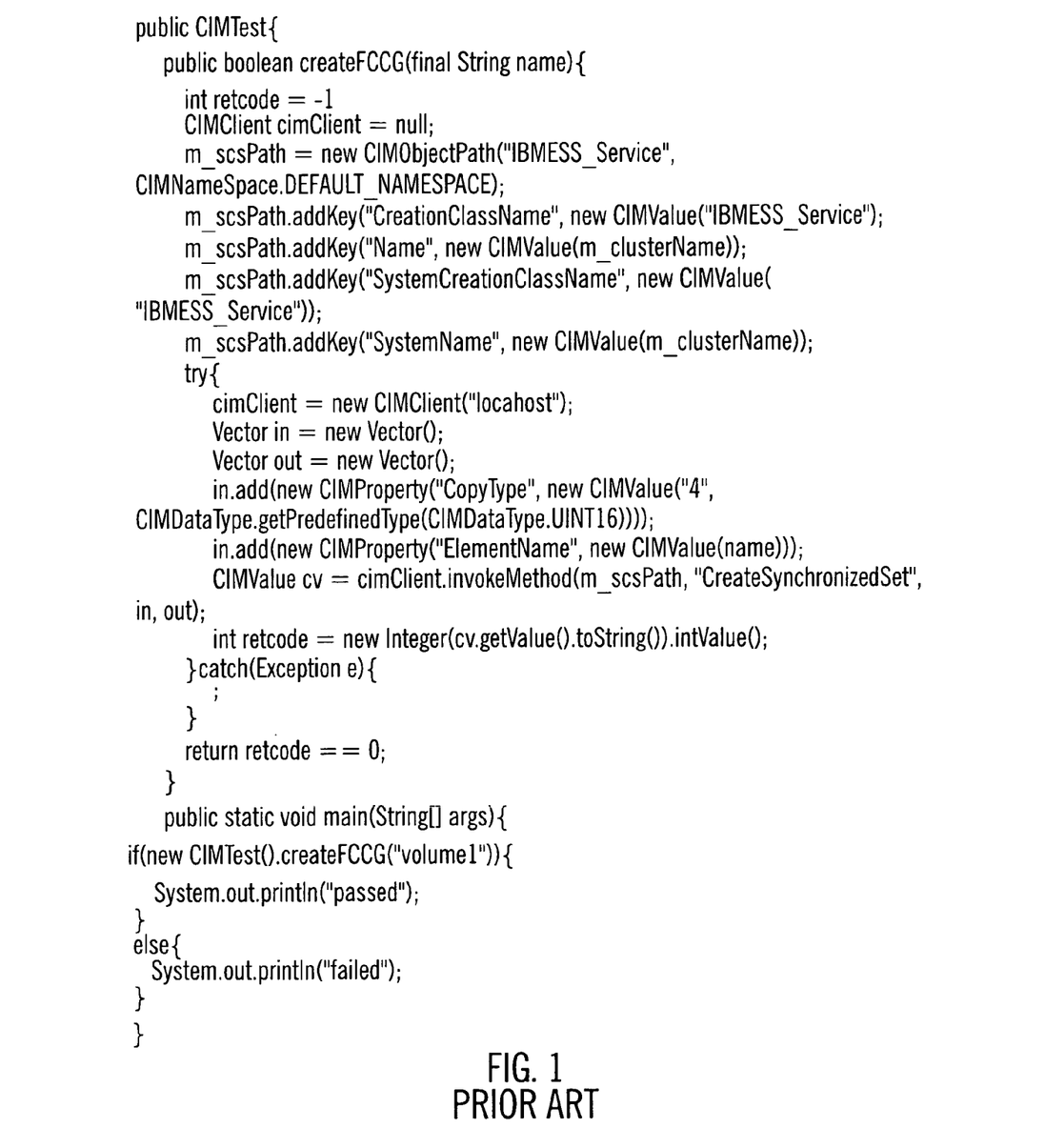
FIG. 1 illustrates an example of a client application as known in the prior art.

FIG. 1 illustrates an example of code used to invoke a CIM method for an extension schema for an International Business Machines ("IBM") Enterprise Storage System® (ESS). (Enterprise Storage Server is a registered trademark of IBM). The sample code of FIG. 1 includes many statements that a client application must include to invoke the "CreateSynchronizedSet" method, including a method from the CIMClient class to establish a session with the CIM object manager and a method from the CIMNameSpace class to instantiate a CIM namespace used for the connection. A CIM namespace is a logical grouping of CIM classes and CIM instances that represent managed objects in a particular environment. The client protocol statements may further include methods from a CIMValue class, which is a class to encapsulate CIM values assigned to properties, references and qualifiers to return to the CIM client application. Thus, any invocation of a CIM method requires that the developer of the CIM client applications must include CIM protocol statements to enable communication with the server and execution of the called method by the client at the server.

There is a need in the art to provide improved techniques for invoking CIM methods in a manner that minimizes the programming complexity resulting from the need to include the CIM protocol statements in the applications invoking the CIM methods to perform device management operations.

SUMMARY

Provided are a method, system, and program for generating executable objects implementing methods for an information model. A file including code defining a class implementing at least one method in an information model is received. The file is translated to produce an object oriented implementation of the class and the at least one method in an object oriented programming (OOP) language file. Protocol statements of the information model are added to the OOP file to enable a client application to invoke the at least one method on a server. The OOP file is compiled to produce an executable object capable of being invoked by a call to a method invocation statement, wherein the client application calling the method invocation statement causes execution of the protocol statements and the at least one method in the executable object to invoke the at least one method on the server.

Provided is code used to invoke a method deployed at a server from a client application, wherein the code causes operations to be performed, the operations comprising: executing a method invocation statement associated with executable code providing an object oriented implementation of a method in a class in an information model and protocol statements of the information model to invoke the method on the server; executing the protocol statements implemented in the executable code in response to executing the method invocation statement to establish communication with the server; and executing the method implemented in the executable code to invoke the method on the server.

Further provided is a method for deploying computing infrastructure, comprising integrating the code into a computing system, wherein the computing system executes the code to invoke the method statement and execute the executable code associated with the invoked method statement.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
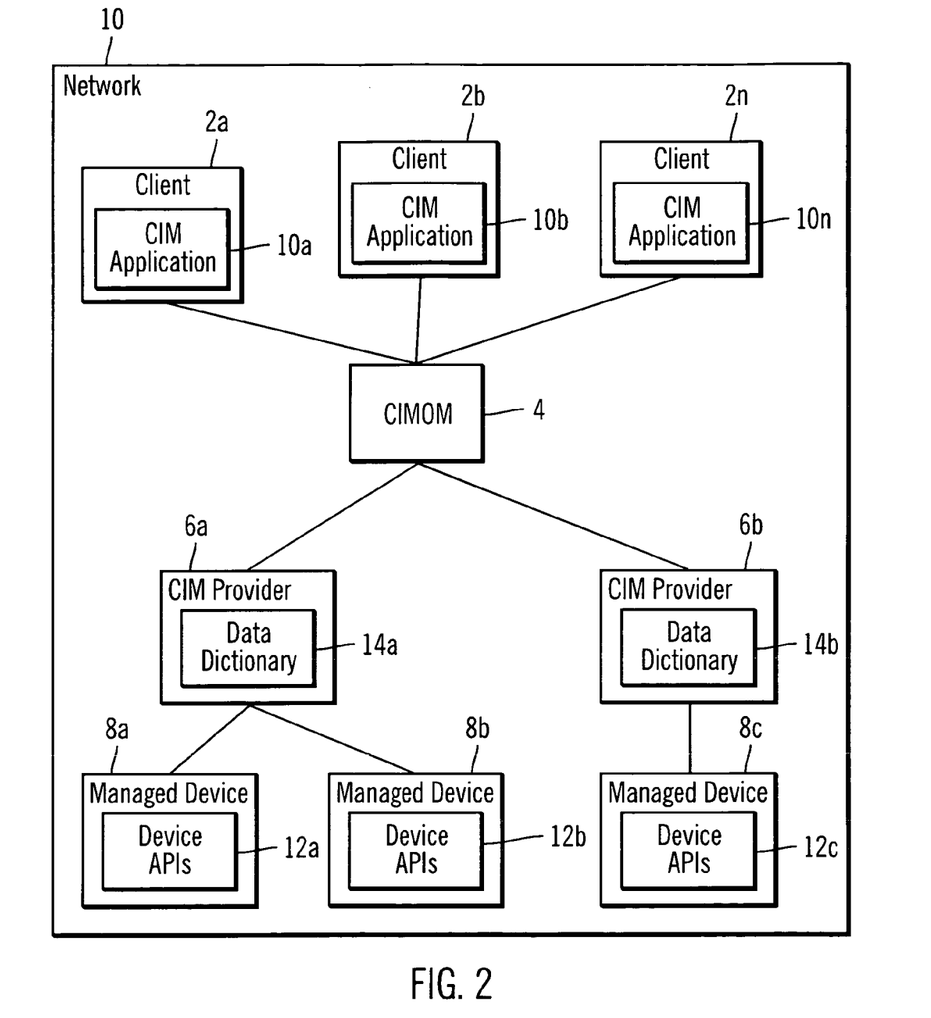
FIG. 2 illustrates a network computing environment in which embodiments are implemented.

FIG. 2 illustrates a computing architecture in which aspects of the invention are implemented. A plurality of client systems 2a, 2b . . . 2n, a CIM Object Manager (CIMOM) 4, CIM providers 6a, 6b, and managed devices 8a, 8b, 8c communicate over a network 10. Each client 2a, 2b . . . 2n includes a CIM application 10a, 10b . . . 10n to generate and communicate CIM management requests comprised of CIM APIs to perform management operations with respect to the managed devices 8a, 8b, 8c. The CIMOM 4 receives CIM requests from the CIM applications 10a, 10b . . . 10n and transfers them to the CIM provider 6a, 6b associated with the managed device 8a, 8b, 8c to which the request is directed. Each managed device 8a, 8b . . . 8n implements device specific APIs 12a, 12b . . . 12n, which perform management related operations, retrieving information, configuration, etc., on the device 8a, 8b . . . 8bn. The CIM provider 6a, 6b includes data dictionaries 14a, 14b that are used to map CIM commands in CIM messages to device specific APIs 12a, 12b . . . 12n capable of implementing the CIM command on the target managed device 8a, 8b . . . 8n. Further details of the CIM model are described in publications from the Distributed Management Task Force (DMTF), including "Common Information Model (CIM) Infrastructure Specification", Version 2.3, Preliminary (Aug. 11, 2004); "CIM Interop Model White Paper", CIM Version 2.7, Version 0.9 (Jun. 19, 2003); and "Common Information Model: Core Model", Version 2.4 (Aug. 30, 2000).

The network 10 may comprise any network known in the art, such as a Local Area Network (LAN), Storage Area Network (SAN), Wide Area Network (WAN), the Internet, a wireless network, etc. Alternatively, the network 10 may comprise a bus interface. The clients 2a, 2b . . . 2n may comprise any type of computational device capable of running a CIM application 10a, 10b . . . 10n, such as a workstation, desktop computer, server, laptop, mainframe, telephony device, hand held computer, etc. The CIMOM 4 may be implemented in a system separate from the clients 2a, 2b . . . 2n. The CIM providers 6a, 6b . . . 6n may run on systems separate from the CIMOM or run within the managed devices 8a, 8b, 8c. Further, one CIM provider 6a, 6b . . . 6n may manage CIM messages for one or more managed devices 8a, 8b . . . 8n. The managed device 8a, 8b . . . 8n may comprise any physical or logical device known in the art, such as a storage device, storage medium, storage media library, Fibre Channel, switch, fabric, database, etc., for which a separate CIM provider may be provided. There may be any number of clients, CIMOMs, CIM providers, and managed devices and relations therebetween in the network, and the implementation is not limited to the configuration and arrangement of components shown in FIG. 2.

In certain embodiments where the managed devices 8a, 8b . . . 8n comprise storage devices or other Input/Output devices, the device vendors may provide CIM providers implementing CIM classes that enable clients 2a, 2b, 2c invoking the CIM methods and APIs to perform management related operations with respect to the managed devices 8a, 8b . . . 8n, such as configure logical partitions within the storage, configure settings, monitor device usage, configure user settings, etc.

The CIM applications 10a, 10b . . . 10n may generate CIM messages including one or more CIM APIs in a manner known in the art, such as described in the publication "Specification for CIM Operations Over HTTP" (Copyright Distributed Management Task Force, Jan. 6, 2003). For instance, the CIM messages may comprise an Extensible Markup Language (XML) file including CIM APIs. The CIM APIs included in a CIM message would further include a target device name or other identifier of the managed device 8a, 8b . . . 8n to which the CIM API command is directed.

Figure 3:
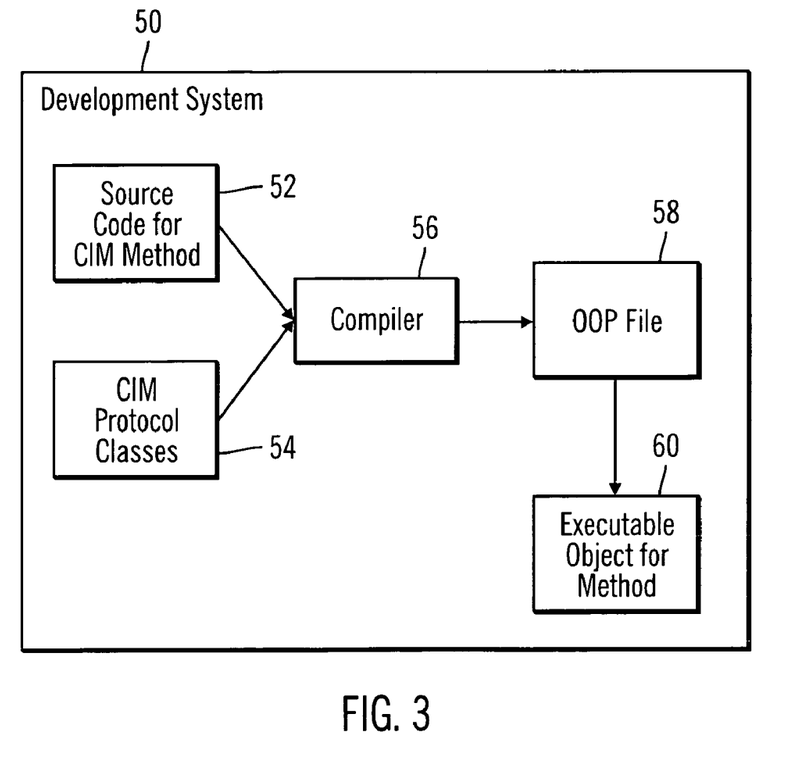
FIG. 3 illustrates an embodiment of a system including a compiler in which embodiments are implemented.

FIG. 3 illustrates an embodiment of a development system 50 including source code 52 for CIM operations and methods to perform device management related operations. The source code 52 may include calls to device management related methods written in the Managed Object Format (MOF) language, which defines the class name and attributes of a managed resource. The components of a MOF file are textual descriptions of object oriented class and instance definitions, element qualifiers (meta-data about classes, properties, methods, etc.), comments, compiler directives, and the specific class and instance definitions for the CIM schema. CIM protocol classes 54 comprise those CIM classes having methods used to enable the client to establish communication with the CIMOM 4 and CIM provider 6a, 6b to have the method called by the client executed by the CIM Provider 6a to perform the device 8a, 8b, 8c management related operations.

A compiler is capable of translating source Common Information Model (CIM) class definitions from one or more MOF files into re-usable/executable Object Oriented Programming (OOP) classes abstracting the communication mechanism (CIM Client API/CIM Protocol) needed to invoke methods, create instance of CIM classes, and navigate the instances on the CIMOM 4 server. The compiler 56 further compiles the OOP file 58 into executable object code 60 for the method. In one embodiment, the executable object code 60 generated by the compiler 56 implements one method for an extension class providing management classes and methods to manage a specific device. In one embodiment, the compiler 56 may include functionality of a MOF compiler that parses MOF files and converts the classes and instances to OOP language classes, such as Java™ (Java is a trademark of Sun Microsystems, Inc.). The compiler 56 may map the CIM elements defined in the MOF file 52 to corresponding Java elements.

The client applications 10a, 10b . . . 10n may invoke a CIM method directly by calling the CIM method name, as it is named by the CIM provider 6a, 6b, which invokes the executable object code 60 for the method. This executable object code 60 executes protocol statements and sets values and parameters in: the CIM Client class to establish communication with the CIMOM 4; the CIM Object Path class to provide the namespace and reference the CIM elements; the CIM Namespace class to instantiate a CIM namespace, and other protocol classes, such as the CIM value and CIM property classes to encapsulate CIM values and properties, where the data describes the data of the class.

Figure 4:
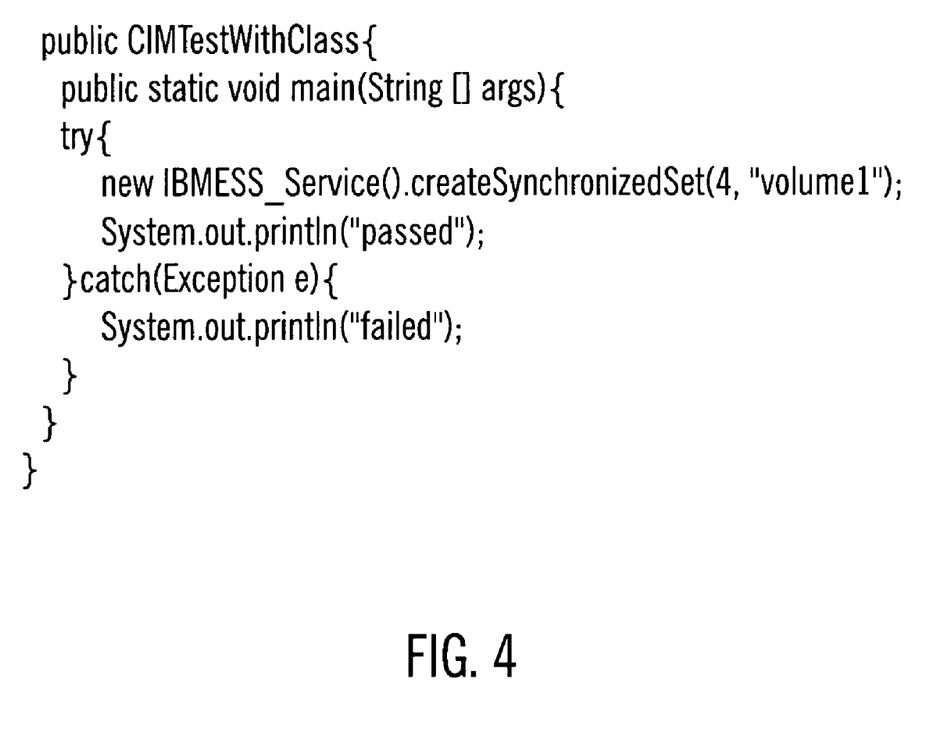
FIG. 4 illustrates an embodiment of a call to invoke a method.

FIG. 4 provides an example of how the CIM operation "SynchronizedSet" may be invoked by the OOP language statements calling the method, which invokes the executable object code 60 implementing that CIM method. This allows the client applications 10a, 10b . . . 10n to invoke CIM class methods with a single call and without including all the CIM protocol statements needed to establish a connection between the client 2a, 2b . . . 2n invoking the method and the CIMOM server 4. The developer of the CIM application 10a, 10b . . . 10n thus does not have to spend coding and debugging efforts on the CIM protocol statements, which are included in the executable object code 60 implementing the CIM methods and operations.

Figure 5:
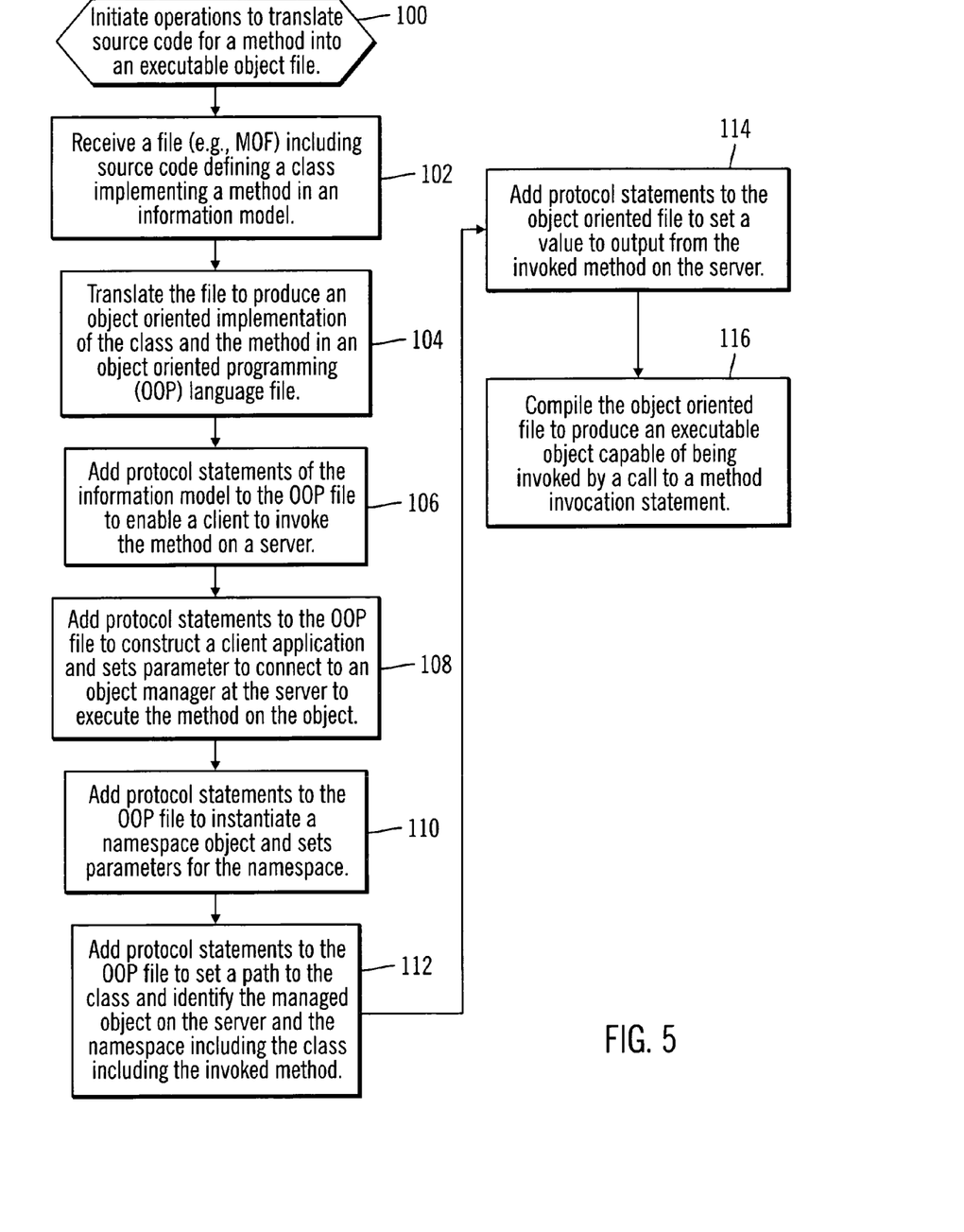
FIG. 5 illustrates an embodiment of operations to create an executable object for at least one method in an information model.

FIG. 5 illustrates operations implemented in the compiler 56 to translate a MOF file implementing a CIM method to executable object code 60 for the method. Control begins at block 100 upon initiating operations to translate source code 52 for a CIM method or operation into an executable object file 60 that may be called and invoked from a client CIM application 10a, 10b ... 10n. As part of initiating the conversion operations, the compiler 56 parses the source code 52, e.g., MOF file, and the classes and instances to Java programming language classes. The compiler 56 receives (at block 102) a file (e.g., MOF) including source code 52 defining a class implementing a method in an information model and translates (at block 104) the source code 52 for that method to produce an object oriented implementation of the class and the method in an object oriented programming (OOP) language file 58.

The compiler 56 further adds (at block 106) protocol statements of the information model to the OOP file 56 to enable the client application 10a, 10b ... 10n to invoke the method on a CIMOM server 4. The compiler 56 may add (at block 108) protocol statements from the protocol classes. The protocol statements enable communication between the client and a provider 6a, 6b at the server to enable the client application 10a, 10b ... 10n to invoke the operations, e.g., CIM methods, with the provider 6a, 6b In one embodiment, the methods may comprise device independent commands that the provider translates to a device specific command to implement the functionality of the method for the device 8a, 8b, 8c subject to management. Methods from the CIM client class may be added (at block 108) to connect to the CIMOM server 4. The compiler 56 may further add (at block 10) protocol statements to the OOP file 58 to instantiate a namespace object and sets parameters for the namespace, such as from the CIM Namespace. The namespace may comprise a logical grouping of classes and methods that represent managed objects, i.e., the objects representing the managed devices. The added protocol statements may further include (at block 112) statements to set a path to the class and identify the managed object on the server and the namespace including the class including the invoked method, such as methods from a CIM ObjectPath class. The compiler 56 may further add (at block 114) statements to set a value to output from the invoked method on the server, where the methods to set the value may be from a CIM Value class. After all the MOF code for the method and the CIM protocol class statements have been added to the OOP language file 58, the compiler 56 translates (at block 116) the OOP File 58 into the executable object 60 to implement the particular CIM method for one or more device management operations.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described embodiments, the information model for a device management schema was the CIM schema. The described embodiments may also apply to device management schemas other than the CIM schema. In such alternative schema, the protocol statements of the schema enable communication with the server or provider implementing the methods.

The described embodiments for generating CIM methods including the protocol statements may be implemented by a vendor providing the CIM methods (APIs) that clients and users may deploy in the CIM environment to perform device management operations with respect to the devices offered by the vendor. In this way, the vendor would use the disclosed compiler embodiment to generate the CIM methods and APIs used in the CIM environment for the vendor's products.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The variable "n" indicates an integer number of instances of an element, and may take different values when used with different elements, such that 56*n* and 86*n* may indicate a same or different number of instances of the field information and field authorization, respectively.

In certain embodiments, the file sets and metadata are maintained in separate storage systems and commands to copy the file sets and metadata are transmitted by systems over a network. In an alternative embodiment, the file sets and metadata may be maintained in a same storage system and the command to copy may be initiated by a program in a system that also directly manages the storage devices including the file sets and metadata to copy.

The illustrated operations of FIG. 5 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving a file including code defining a class implementing at least one method in an information model for a device management schema and wherein one of the at least one method relates to device management operations with respect to a device;
translating the file to produce an object oriented implementation of the class and the at least one method for the device management operations for the device in an object oriented programming (OOP) language file;
adding protocol statements of the information model to the OOP file to enable a client application to invoke the at least one method on a server to perform the device management operations with respect to the device; and
compiling the OOP file to produce an executable object capable of being invoked by a call to a method invocation statement, wherein the client application calling the method invocation statement causes execution of the protocol statements and the at least one method in the executable object to invoke the at least one method on the server to cause the device management operations of the method with respect to the device.

2. The method of claim 1, wherein the protocol statements enable communication between the client and a provider at the server to enable the client to invoke the at least one method with the provider, wherein the at least one method comprises a device independent command that the provider translates to a device specific command to implement the functionality of the at least one method for the device.

3. The method of claim 1, wherein the device management schema comprises a Common Information Model (CIM) schema.

4. The method of claim 1, wherein the device management schema implements a core model including classes and methods common to all areas of device management and wherein the at least one method invoked through the executable object is a member of class in an extension schema providing classes related to a specific technology.

5. The method of claim 1, wherein the protocol statements added to the OOP file establish a connection to connect to an object manager at the server to execute the at least one method.

6. The method of claim 1, wherein the protocol statements added to the OOP file instantiate a namespace object and set parameters for the namespace, wherein the namespace comprises a logical grouping of classes and methods that represent managed objects.

7. The method of claim 6, wherein the protocol statements added to the OOP file set a path to the class and identifies a managed object on the server and the namespace including the class including the invoked method.

8. The method of claim 6, wherein the protocol statements added to the OOP file sets a value to output from the invoked method on the server.

9. A system used to generate methods deployed at a server and invoked by a client application, comprising:
a processor;
a storage device including a file including code defining a class implementing at least one method in an information model for a device management schema and wherein one of the at least one method relates to device management operations with respect to a device;
a computer readable medium including code executed by the processor to perform operations, the operations comprising:
translating the file to produce an object oriented implementation of the class and the at least one method for the device management operations for the device in an object oriented programming (OOP) language file;
adding protocol statements of the information model to the OOP file to enable the client application to invoke the at least one method on the server to perform the device management operations with respect to the device; and
compiling the OOP file to produce an executable object capable of being invoked by a call to a method invocation statement, wherein the client application calling the method invocation statement causes execution of the protocol statements and the at least one method in the executable object to invoke the at least one method on the server to cause the device management operations of the method with respect to the device.

10. The system of claim 9, wherein the protocol statements enable communication between the client and a provider at the server to enable the client to invoke the at least one method with the provider, wherein the at least one method comprises a device independent command that the provider translates to a device specific command to implement the functionality of the at least one method for the device.

11. The system of claim 9, wherein the device management schema comprises a Common Information Model (CIM) schema.

12. The system of claim 9, wherein the device management schema implements a core model including classes and methods common to all areas of device management and wherein the at least one method invoked through the executable object is a member of class in an extension schema providing classes related to a specific technology.

13. The system of claim 9, wherein the protocol statements added to the OOP file establish a connection to connect to an object manager at the server to execute the at least one method.

14. The system of claim 9, wherein the protocol statements added to the OOP file instantiate a namespace object and set parameters for the namespace, wherein the namespace comprises a logical grouping of classes and methods that represent managed objects.

15. The system of claim 14, wherein the protocol statements added to the OOP file set a path to the class and identifies a managed object on the server and the namespace including the class including the invoked method.

16. The system of claim 14, wherein the protocol statements added to the OOP file sets a value to output from the invoked method on the server.

17. An article of manufacture comprising a computer readable storage medium having code executed to generate methods deployed at a server and invoked by a client application, wherein the code causes operations to be performed, the operations comprising:
    receiving a file including code defining a class implementing at least one method in an information model for a device management schema and wherein one of the at least one method relates to device management operations with respect to a device;
    translating the file to produce an object oriented implementation of the class and the at least one method for the device management operations for the device in an object oriented programming (OOP) language file;
    adding protocol statements of the information model to the OOP file to enable the client application to invoke the at least one method on the server to perform the device management operations with respect to the device; and
    compiling the OOP file to produce an executable object capable of being invoked by a call to a method invocation statement, wherein the client application calling the method invocation statement causes execution of the protocol statements and the at least one method in the executable object to invoke the at least one method on the server to cause the device management operations of the method with respect to the device.

18. The article of manufacture of claim 17, wherein the protocol statements enable communication between the client and a provider at the server to enable the client to invoke the at least one method with the provider, wherein the at least one method comprises a device independent command that the provider translates to a device specific command to implement the functionality of the at least one method for the device.

19. The article of manufacture of claim 17, wherein the device management schema comprises a Common Information Model (CIM) schema.

20. The article of manufacture of claim 17, wherein the device management schema implements a core model including classes and methods common to all areas of device management and wherein the at least one method invoked through the executable object is a member of class in an extension schema providing classes related to a specific technology.

21. The article of manufacture of claim 17, wherein the protocol statements added to the OOP file establish a connection to connect to an object manager at the server to execute the at least one method.

22. The article of manufacture of claim 17, wherein the protocol statements added to the OOP file instantiate a namespace object and set parameters for the namespace, wherein the namespace comprises a logical grouping of classes and methods that represent managed objects.

23. The article of manufacture of claim 22, wherein the protocol statements added to the OOP file set a path to the class and identifies a managed object on the server and the namespace including the class including the invoked method.

24. The article of manufacture of claim 22, wherein the protocol statements added to the OOP file sets a value to output from the invoked method on the server.

25. An article of manufacture comprising code to invoke a method deployed at a server from a client application, wherein the code causes operations to be performed, the operations comprising:
    executing a method invocation statement associated with executable code providing an object oriented implementation of a method in a class in an information model for a device management schema, wherein the method relates to device management operations with respect to a device, and protocol statements of the information model to invoke the method on the server;
    executing the protocol statements implemented in the executable code in response to executing the method invocation statement to establish communication with the server, wherein the protocol statements enable communication between the client and a provider at the server to enable the client application to invoke the method with the provider, wherein the method comprises a device independent command that the provider translates to a device specific command to implement the functionality of the method for the device; and
    executing the method implemented in the executable code to invoke the method on the server to cause the device management operations with respect to the device.

26. The article of manufacture of claim 25, wherein the protocol statements implemented in the executable code establish a connection to connect to an object manager at the server to execute the method.

27. The article of manufacture of claim 25, wherein the protocol statements implemented in the executable code instantiate a namespace object and set parameters for the namespace, wherein the namespace comprises a logical grouping of classes and methods that represent managed objects.

28. The article of manufacture of claim 27, wherein the protocol statements implemented in the executable code set a path to the class and identify a managed object on the server and the namespace including the class including the invoked method.

29. The article of manufacture of claim 27, wherein the protocol statements implemented in the executable code set a value to output from the invoked method on the server.

30. A method for deploying computing infrastructure, comprising integrating the code in the article of manufacture of claim 25 into a computing system, wherein the computing system executes the code to execute the method invocation and execute the executable code associated with the invoked method statement.

* * * * *